United States Patent Office 2,717,245
Patented Sept. 6, 1955

2,717,245

COATING COMPOSITION FOR FLOORING, WALLS, AND THE LIKE

Annis G. Asaff, Auburndale, Mass., assignor to Callaghan Hession Corporation, Boston, Mass., a corporation of Massachusetts No Drawing. Application December 18, 1953, Serial No. 399,181

8 Claims. (Cl. 260—31.2)

This invention relates to surface coatings or coverings for floors, walls and the like. The least expensive floor coverings today are surface coatings applied like paint with a brush. Usually two coats are applied and the covering is so thin that it wears through rapidly when subjected to any considerable traffic. Other floor coverings, such as linoleum and tiling are available as thin as one-eighth inch but there is little or no floor covering material available in thicknesses between the very thin brushable coatings and the one-eighth inch coverings. The primary object of my invention is to provide a new and improved coating composition that can be applied by trowel to floors, walls and the like in varying thicknesses within these limits and form a covering having desirable characteristics as hereinafter described.

While paints may be thickened with fillers or other means there is no satisfactory way of applying them in considerable thicknesses, due to the sticky nature of the material. Also, they will not dry readily unless filled to a point where adhesion and cohesion becomes lost. Asphalt and other film forming materials may be emulsified to remove the stickiness and then thickened with fillers and applied to desired thickness by brush or trowel. However, emulsions are not waterproof and consequently can neither be used out of doors nor where moisture is a problem. Furthermore, emulsions freeze and their shipping and storage therefore present many problems. Also, the process of emulsification limits emulsions to asphalts and the like of lower melting point.

In order to avoid the above limitations and provide certain other advantages, asphalt cut-backs or hot melts have been employed. Both of these methods permit the use of higher melting point asphalts and result in waterproof installations. However, cut-backs are similar to paints in that only thin layers may be applied because of the problem of drying. Furthermore, since cut-backs cannot be troweled to give a smooth surface the viscosity must be so adjusted as to permit brushing, thereby necessarily resulting in substantially reduced solids content. Also, since cut-backs are of a liquid consistency like paints, great difficulty is experienced in applying appreciable thicknesses on vertical surfaces because of sagging.

In the case of hot melts, the asphalt must be applied in thicknesses of at least one inch because of the problem of cooling. If thicknesses less than one inch of asphalt are applied the coating solidifies too rapidly for easy and smooth application. Furthermore, the danger and difficulty of handling hot melts poses many problems, especially from the standpoints of the workmen and the operations involved.

I have discovered that upon the addition of alcohol to a mixture of aggregate filler material and a vehicle comprising certain film forming materials dissolved in selected solvents, there eventually results a separation of the mixture into two phases, one being liquid, and the other being a mastic which is plastic and cohesive, yet of such non-adhesive character that it can be spread with a trowel. The mastic phase is readily separated from the liquid phase, as by pouring off the latter, and is ready for application to the surface to be coated. I have thus employed asphalt, chlorinated rubber, polystyrene and Vinylite (a copolymer of vinylchloride and vinylacetate) as film forming materials and formed coating compositions therefrom that can be applied to desired thickness with trowel. A further object of the invention consists in the production of such vehicles and coating compositions, all as hereinafter more specifically described.

In describing this invention, chlorinated rubber and polystyrene will be considered as the preferred film-forming materials. The purpose of my invention is so to formulate chlorinated rubber or polystyrene that it can be applied very easily in appreciable thicknesses on horizontal or vertical surfaces without any of the difficulties attendant to the use of emulsions or solutions. In accomplishing this object, I first form a vehicle by dissolving the film-forming material in a mixture of suitable solvents, including active solvents in the class of aromatic hydrocarbons and less active solvents in the class of the acetate esters of the lower aliphatic alcohols, the latter serving to decrease the solvent activity of the former and thereby produce a vehicle capable of responding to the action of alcohol in removing stickiness, and add suitable aggregates to the vehicle. Alcohol is then added to the aggregate-vehicle mixture, while stirring, until a two-phase separation occurs. This point is readily detected by the formation of a liquid phase and a plastic and cohesive phase. The latter phase is then separated out for application to the surface. The steps embodied in producing the vehicle and mastic will now be specifically described in connection with chlorinated rubber, which I have employed and found suitable.

The aromatic hydrocarbons which I have thus far employed include benzol, toluol and xylol. Other hydrocarbons high in aromatic content may also be employed. The acetate esters thus far employed include ethyl acetate, isopropyl acetate, butyl acetate and amyl acetate. Other homologs may also be employed and are fully equivalent for purposes of this invention.

In the production of my improved vehicle and mastic I proceed by dissolving chlorinated rubber in a suitable solvent mixture and I have found that xylol is the most suitable of the aromatic hydrocarbons and that butyl acetate is the most suitable of the acetate esters. The butyl acetate is a slower acting solvent and I have found that a solvent including xylol and butyl acetate and comprising 50 to 75 per cent butyl acetate is most suitable for forming the desired vehicle of my invention. A preferred vehicle is as follows:

Example 1

70 cc. butyl acetate
30 cc. xylol
30 gm. chlorinated rubber (Parlon 125)
30 gm. fortifying and extending resin (Arochlor 5460)
10 gm. plasticizer (Arochlor 1254)

Arochlor 5460 is a commercially available chlorinated polyphenol, and Arochlor 1254 is a chlorinated biphenol. The resulting vehicle is then mixed with suitable aggregates. The aggregates which I have thus far employed include sand, mica, marble dust, asbestos and pigments. The amount of aggregate employed can be varied within wide limits and will depend on the thickness and quality of the surface coating that is desired. As little as 26 per cent aggregate, based on the weight of the vehicle may be employed to give a rapidly hardening coating having a very smooth surface comparable to a highly troweled plaster wall.

Example 2

100 gms. vehicle of Example 1
10 gms. Cellite 110
10 gms. #100 mica
4 gms. Titanox
2 gms. chrome green
20 gms. alcohol The vehicle and aggregates are combined and mixed to give a sticky paste which would be difficult to spread. The alcohol is then added while mixing and an unexpected two phase separation occurs. The mix becomes thicker and a water-like liquid separates, while the mastic forms as a coherent mass and loses its stocky character. Mixing separates adhering mastic from the sides of the container, apparently incorporating it into the mass, leaving the walls of the container free and clean of mastic. The alcohols that are suitable include methyl, ethyl, propyl or isopropyl.

Upon separating out some of this mastic and spreading it with a spatula in a layer about 1/16 inch thick very little stickiness is apparent, and the mastic can be smoothed similarly to a Portland cement, sand and water mixture. Overnight the mastic hardens sufficiently for ordinary practical use and it is waterproof and adherent.

Incorporating greater proportions of aggregates results in mastics that are more wear resistant and which can be applied in greater thicknesses.

Example 3

100 gms. vehicle of Example 1
65 gms. beach sand
7 gms. #100 mica
3 gms. chrome green
26 gms. alcohol

Example 4

100 gms. vehicle of Example 1
71 gms. marble dust
7 gms. #100 mica
4 gms. Titanox
2 gms. chrome green
25 gms. alcohol Both of these compositions are compounded the same as Example 2. The mastic of Example 3 provides a relatively smooth surface with a high gloss and makes a very attractive floor covering. The mastic of Example 4 provides a hammered finish and it is especially attractive and useful on walls or on materials where the hiding of joints is a problem. Because of the higher aggregate content of the mastics of Examples 3 and 4, they provide surfaces that are more durable than those provided by the mastic of Example 2. All of the above-described mastics provide surface coatings that are moistureproof and alkali and acid resistant, and they are, therefore, particularly useful as a protective coat for steel, in swimming pools, exterior coatings, and as a covering for cement floors.

The amount of aggregate can be increased beyond the amounts shown in the examples to give compositions applicable in thicker films. I have found that aggregates incorporated to the extent of 200 per cent based on the weight of vehicle result in suitable mastics, but which require more time to dry. The amount and type of aggregate ultimately depends on the desired thickness and surface of the coating.

It will be understood that although my preferred vehicle of Example 1 includes as film-forming material chlorinated rubber and chlorinated polyphenol in equal proportions, the presence of the chlorinated polyphenol is not essential and may be eliminated entirely or in part or replaced entirely or in part by chlorinated rubber or by other extending and fortifying resins. A satisfactory, but somewhat more expensive, vehicle can be prepared in accordance with Example 1, but with 60 grams of chlorinated rubber instead of 30 grams of chlorinated rubber and 30 grams of chlorinated polyphenol.

Polystyrene may similarly be employed in producing the vehicle and mastic of this invention. The same solvents and solvent system as used with chlorinated rubber compositions are equally usable with polystyrene. One vehicle is as follows:

Example 5

70 cc. butyl acetate
30 cc. xylol
30 grams polystyrene
2.5 grams tricresyl phosphate This vehicle may be incorporated with aggregates and alcohol in the same manner as the vehicle of Example 1 is incorporated in the mastics of Examples 2, 3 and 4. However, I find that slightly more alcohol is required to cause the two phase separation when the vehicle of Example 5 is used than when the vehicle of Example 1 is used. A mastic corresponding to the mastic of Example 3 but using the vehicle of Example 5 instead of the vehicle of Example 1 is as follows:

Example 6

100 gms. vehicle of Example 5
65 gms. beach sand
7 gms. #100 mica
3 gms. chrome green
35 gms. alcohol The greater quantity of alcohol in the mastic of Example 6, 35 grams as compared with the 26 grams required in Example 3, is probably required because of the lower concentration of film forming material in the vehicle of Example 5 than that of the vehicle of Example 1, 30 grams as compared with 60 grams. In this connection it will be understood that the amount of alcohol required to cause the two-phase separation depends upon a number of factors, including the concentration of film-forming material in the vehicle, and the amount of aggregate filler material. Although the foregoing examples indicate that ordinarily between about 20 and 35 grams of alcohol per 100 grams of vehicle are necessary, no precise quantitative yet general statement specifying the required amount of alcohol can be made. In any case, the alcohol is added to the mixture, while stirring, until the two phase separation described above occurs which may be readily observed by any one skilled in the art.

The vehicles described above contain plasticizer to improve the flexibility and toughness of the product, but plasticiser can be eliminated, if desired, to give a hard surface coating, or the amount can be increased to give softer and more flexible products.

The compositions of this invention can be applied to surfaces of concrete, asbestos shingles, steel, glass, wood and Masonite, to name but a few examples. The compositions spread readily to the desired thickness on all these surfaces, form a secure bond therewith and provide resistance to moisture and acids comparable to cut-back asphalt.

This application is filed as a continuation-in-part of my pending application, Ser. No. 191,734, filed October 23, 1950, now abandoned which presents divisional matter from my application, Ser. No. 32,543, filed June 11, 1948, now Patent No. 2,596,323.

Having disclosed my invention and described in detail preferred embodiments thereof, I claim and desire to secure by Letters Patent:

1. The method of forming a surface coating mastic comprising adding and mixing an aliphatic alcohol having less than four carbon atoms with a mixture of aggregate filler material and a vehicle therefor comprising firm-forming material selected from the group consisting of chlorinated rubber and polystyrene dissolved in a solvent comprising between about 50 and 75 per cent by weight of an acetate ester of an aliphatic alcohol having less than 6 carbon atoms and between about 50 and 25 per cent by weight of a liquid aromatic hydrocarbon in the proportion of between about 30 and 60 grams of film-forming material to 100 cc. of solvent, said alcohol being added until a two-phase separation of the mixture occurs, one phase being the mastic composition which is plastic and cohesive and of such non-sticky character that it can be spread with a trowel, and separating the two phases to obtain said mastic.

2. The method defined by claim 1 wherein the film-forming material is chlorinated rubber.

3. The method defined by claim 1 wherein the film-forming material is polystyrene.

4. The method defined by claim 1 wherein the acetate ester is butyl acetate.

5. The surface coating mastic composition formed by the process defined in claim 1.

6. The surface coating mastic composition formed by the process defined in claim 2.

7. The surface coating mastic composition formed by the process defined in claim 3.

8. The surface coating mastic composition formed by the process defined in claim 4.

References Cited in the file of this patent

UNITED STATES PATENTS 2,034,297   Heyse _____ Mar. 17, 1936